Nov. 3, 1931.  W. A. READY  1,829,809
MACHINE FOR MAKING D-HANDLES
Filed Jan. 20, 1931  4 Sheets-Sheet 1
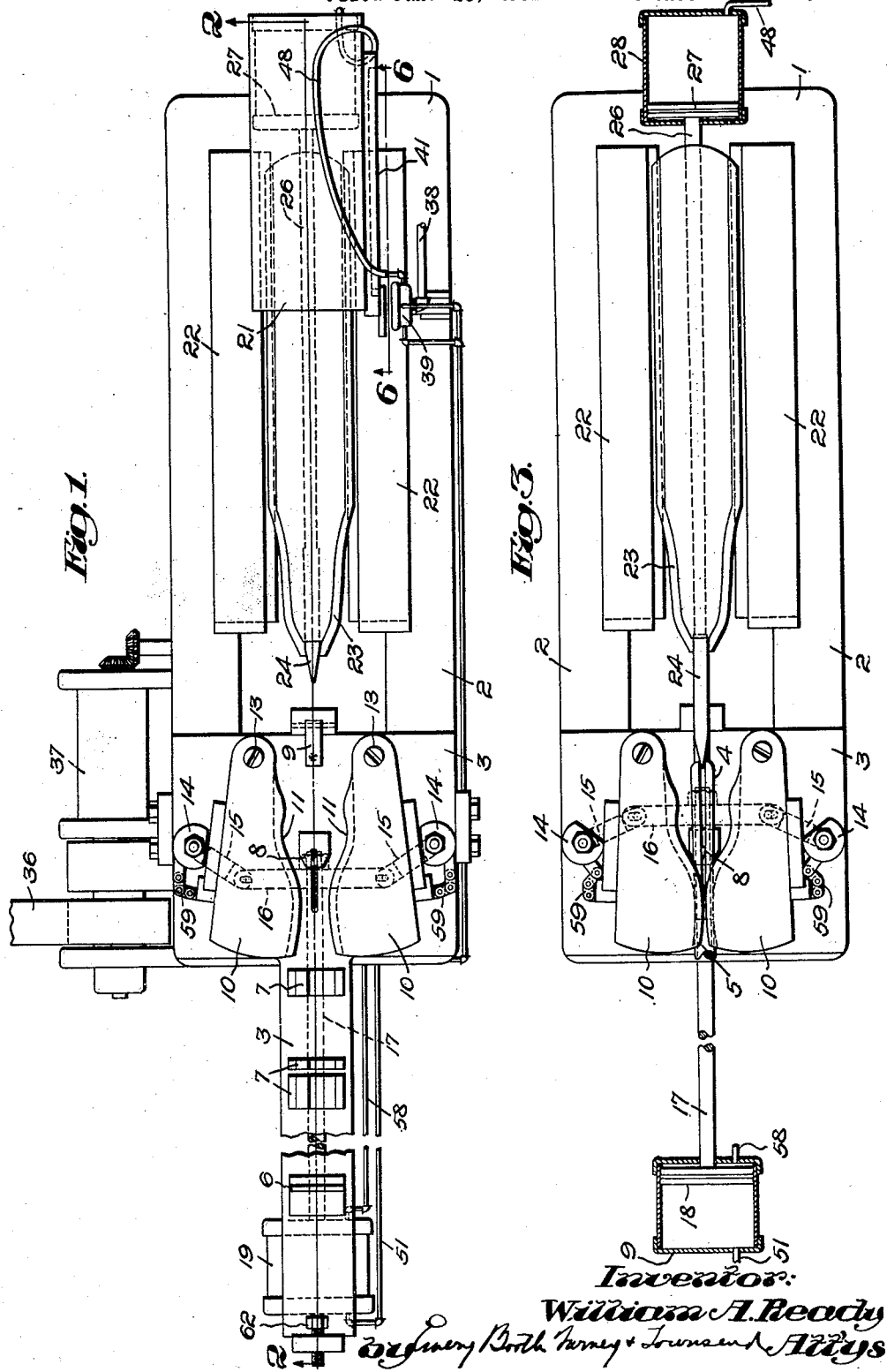

Nov. 3, 1931.  W. A. READY  1,829,809
MACHINE FOR MAKING D-HANDLES
Filed Jan. 20, 1931  4 Sheets-Sheet 2
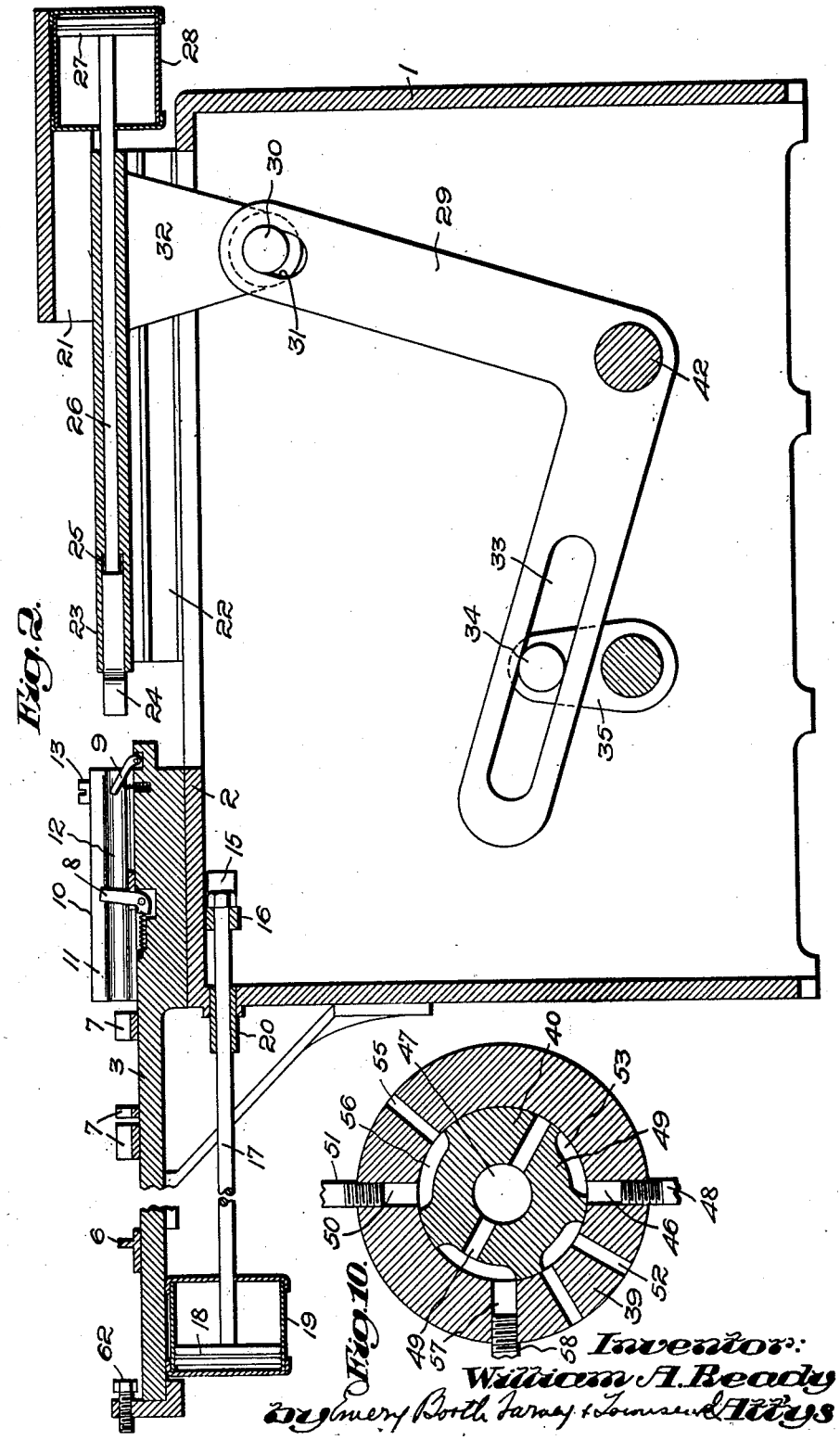

Nov. 3, 1931.   W. A. READY   1,829,809
MACHINE FOR MAKING D-HANDLES
Filed Jan. 20, 1931   4 Sheets-Sheet 3
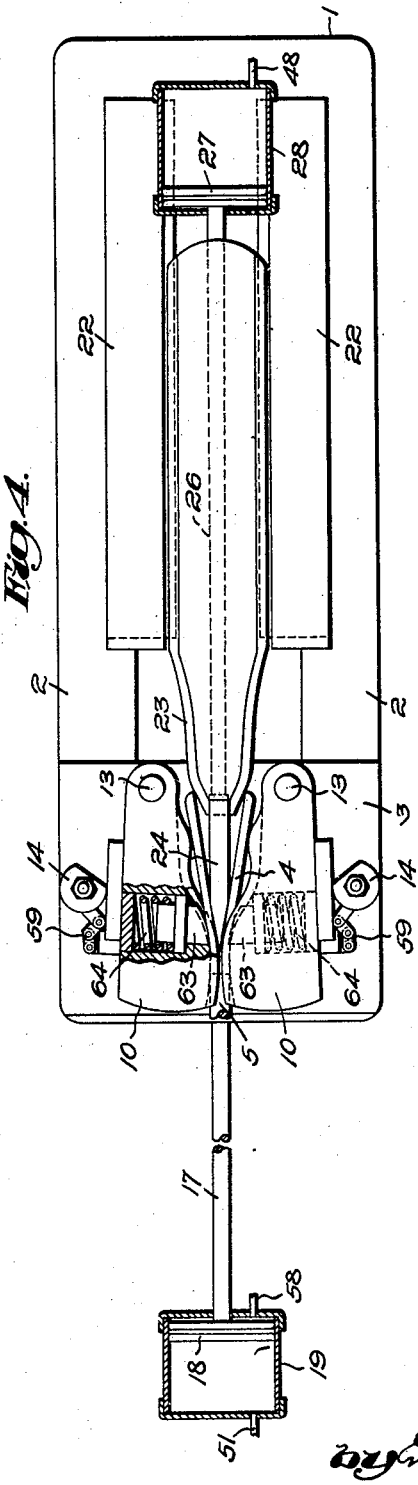
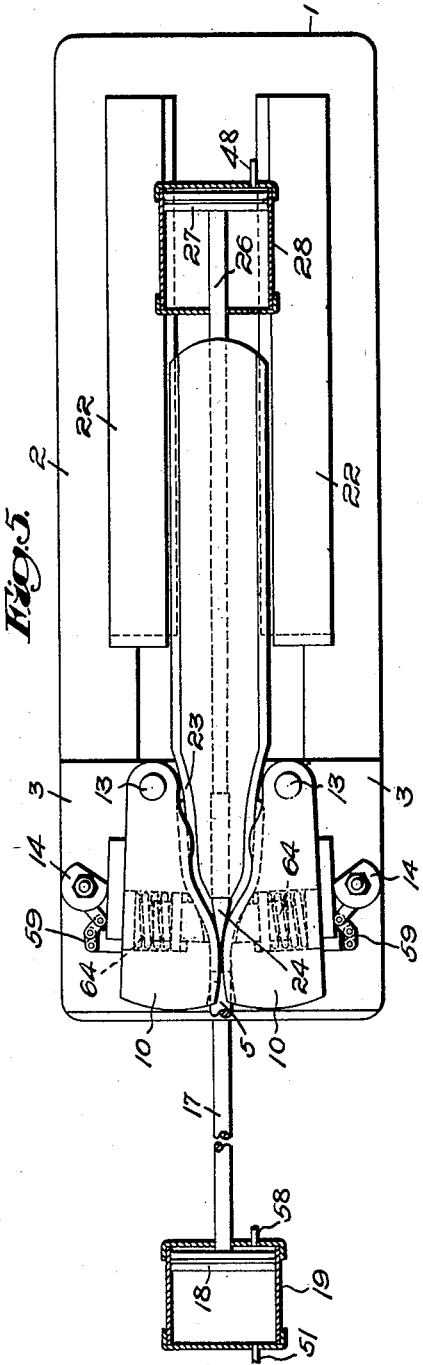
Inventor:
William A. Ready

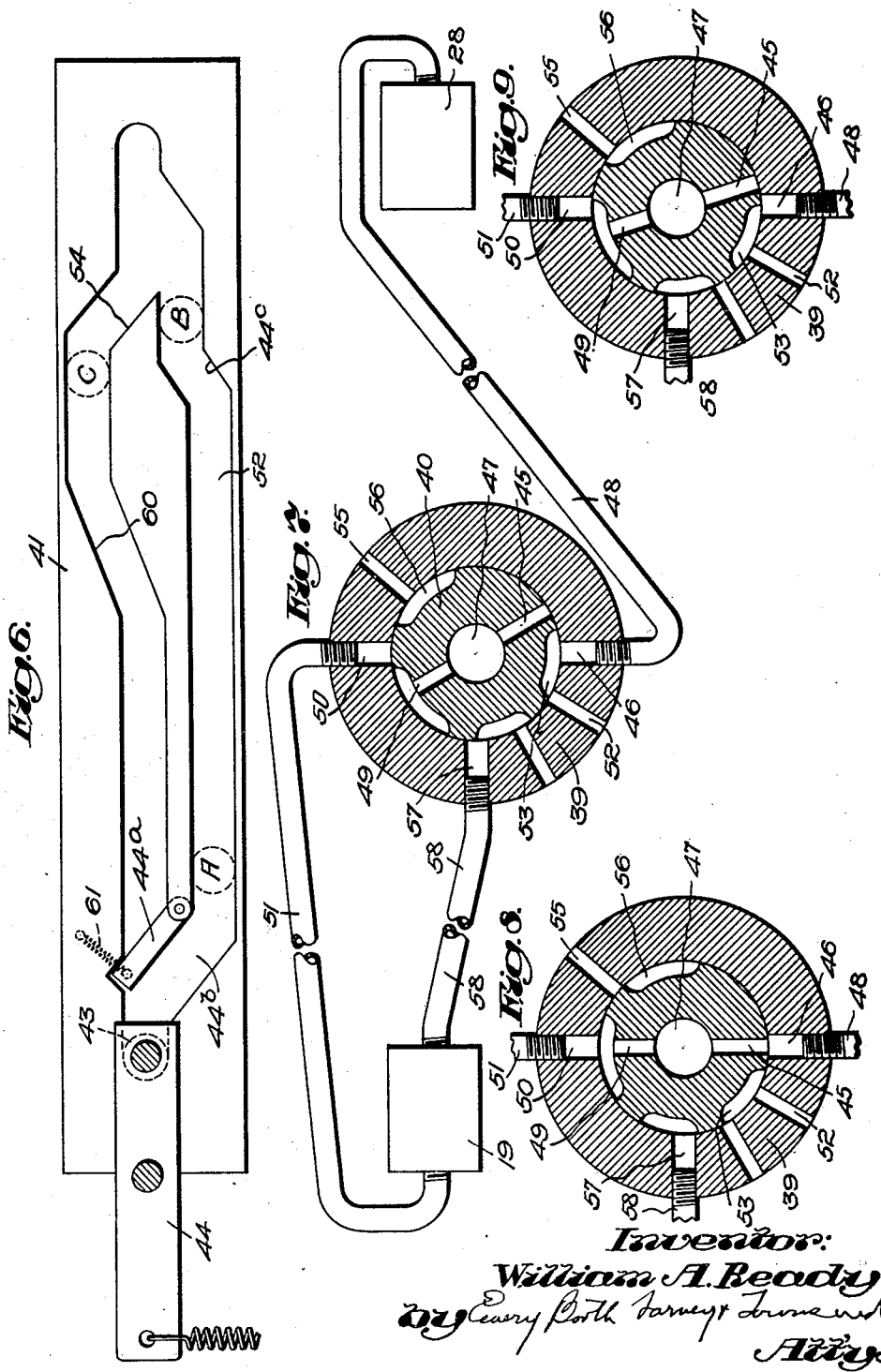

Patented Nov. 3, 1931

1,829,809

UNITED STATES PATENT OFFICE

WILLIAM A. READY, OF BROOKLINE, MASSACHUSETTS

MACHINE FOR MAKING D-HANDLES

Application filed January 20, 1931. Serial No. 509,968.

My invention aims to provide improvements in a machine for spreading the longitudinally divided parts of handles in the making of D-handles for shovels and the like.

In the drawings which illustrate a preferred embodiment of my invention:—

Figure 1 is a plan view of my improved machine showing the relation of the parts prior to insertion of a handle to be formed;

Fig. 2 is a vertical section through the machine taken on the line 2—2 of Figure 1;

Fig. 3 is a combined plan and plan section of the machine showing the mold means closed and the wedge member just entering the slot in the handle member;

Fig. 4 is a view similar to that shown in Fig. 3 but showing the spreading and forming means advanced toward the mold means, the wedge member having spread the side portions of the handle;

Fig. 5 is a view similar to that shown in Figs. 3 and 4 but showing the relation of the parts of the machine at the completion of the forming operation;

Fig. 6 is an enlarged section taken on the line 6—6 of Figure 1 showing the valve operating mechanism;

Fig. 7 is a section of the valve which controls the pressure supply and diagrammatic elevation of the pipes and cylinders connected by the pipes to the valve, the valve being shown in normal position;

Fig. 8 is a section of the valve and valve casing showing the valve in the position for supplying pressure to both cylinders during the handle spreading operation;

Fig. 9 is a section of the valve and valve casing showing the position of the valve when the presure is cut off from the wedging member actuating cylinder while the pressure remains on in the mold-actuating cylinder in mold closing position; and Fig. 10 is a section of the valve casing and valve showing the valve in position to supply pressure to the mold-actuating cylinder to open the mold means.

Referring to the particular embodiment of my invention illustrated by the drawings, I have shown a machine which is particularly, though not exclusively adapted for use in connection with the spreading of the casing and split end of a stale of a D-handle such as is shown and described in my co-pending application Serial No. 341,131, filed February 19, 1929.

The particular machine illustrated has a frame 1 which supports the various elements of the machine. On the top 2 of the machine is attached a plate 3 (Figs. 1 and 2) to which is attached the mold means which provides the shape to which the metal clad longitudinally divided end 4 of the handle 5 (Fig. 5) is bent. The plate 3 also supports the end stop member 6, the U-shaped positioning members 7, the pivoted finger 8 for entrance in the slit in the end 4 of the handle 5 and the pivoted end stop 9.

The mold means comprises two halves 10 pivotally mounted upon the plate 3 (Figure 1) and each having an edge 11 facing an edge of the other which is substantially the shape to which it is desired to bend the end 4 of the handle 5. At the edges 11 I have provided half round grooves 12 providing rounded wall surfaces which diverge and form the walls against which the halves of the end 4 of the handle 5 are eventually bent, as hereinafter described. The halves 10 are preferably adapted to be moved about their pivots 13 so that they may be moved toward and away from each other. Therefore, I have illustrated one efficient mold mechanism which I have used on my improved machine. This mechanism includes rotatably mounted cams 14—14 (Figs. 1, 3, 4 and 5) which are interconnected by means of links 15—15 and 16. The link 16 is attached at its center to a rod 17 which, in turn, is attached to a piston 18 located in a cylinder 19 secured to the under side of the plate 3, as best shown in Figs. 1 and 2. The rod 17 passes through a bearing 20 (Fig. 2) in the frame 1 and is reciprocable therein.

A mechanism for spreading the two halves of the end 4 of the handle 5 is also supported by the top 2 of the frame. This mechanism is reciprocable upon the top 2 toward and away from the mold means. Therefore, I have provided a carriage 21 slidable upon a suitable track means 22—22 and carrying a forming member 23 and a wedging member 24. The wedging member 24 is carried in a bore 25 through the forming member and has its outer end formed into a wedge shape while the inner end is attached to or formed integral with a rod 26 at the other end of which is attached a piston 27 located in a cylinder 28 supported by the carriage 21. Any suitable mechanism may be used for driving the carriage, but I have shown a bell-crank 29 pivoted to the lower portion of the frame and having one end connected by a pin 30 and slot 31 to a connecting member 32 depending from the carriage 21, as best shown in Fig. 2. The other end of the bell-crank 29 is connected through a relatively long slot 33 and a pin 34 located therein to a crank 35 which is supported by the frame and is driven by a belt 36 (Figure 1) or other means through a suitable gearing contained in a gear box 37.

The means for supplying pressure to the cylinders 19 and 28 comprises a pressure supply conduit 38 (Figure 1) connected to the center of a valve casing 39 (Figs. 7 to 10) in which is reciprocated a rotary type valve 40. The cylinders are suitably connected to the valve casing (Figs. 1 and 7) by means of conduits, as and for the purposes hereinafter to be described. A valve-actuating device 41 is carried by the carriage 21 and moves relative to the valve casing which is fixed to the frame thereby to operate the valve 40 and control the supply of pressure to the cylinders.

Assuming the parts of the machine to be in the idle positions, as shown in Figs. 1 and 2, I will now proceed to describe the operation of the machine in the process of forming the part 4 of the handle 5 into a Y-shaped formation. A stale or handle member 5 having one end split and telescoped into a metal casing, as described in my above-entitled application, is placed in the U-shaped supporting blocks 7 with the split end against the stop member 9. Then the power is applied to the mechanism in the gear box 37 as by means of a suitably driven belt 36 (Figure 1), thereby setting the crank 35 into rotary operation. As the crank 35 is rotated, the pin 34, carried thereby, swings the bell-crank 29 about its pivot 42, thereby moving the carriage 21 forward, as will be observed from Fig. 2. The initial forward movement of the carriage moves the valve-actuating member 41 relative to the roller 43 (Figs. 1 and 6) carried at one end of an arm 44 pivoted to the valve 40, thereby causing the finger 44ª (Fig. 6) to move the roller downwardly in the drop 44ᵇ in the raceway cut in the member 41 to the dotted line position A shown in Fig. 6. Thus, the arm 44 is moved downwardly thereby turning the valve to the position shown in Fig. 8. This movement of the valve 40 brings the port 45 into communication with the outlet 46 in the casing 39 and allows air or other suitable pressure to pass from the main bore 47, connected to the main supply conduit 38, through the port 45 and passage 46 to the conduit 48 and through that conduit to the cylinder 28 at the rear side of the piston 27. The pressure immediately forces the piston 27 forward in the cylinder 28 thereby moving the wedging member 24 relative to the forming means 23 as the carriage 21 is moved forward so that the wedge shaped end will enter the slit in the handle means, as best shown in Fig. 3. The conduit 48 is preferably flexible to move with the cylinder 28 when the carriage 21 is reciprocated.

Before the valve 40 is turned far enough to bring the port 45 into communication with the outlet 46, a port 49 is brought into communication with another outlet port 50 (Fig. 7). This port 49 permits air pressure to pass from the bore 47 to the conduit 51 which is connected between the outlet port 50 and the rear end of the cylinder 19, thereby to admit pressure to force the piston 18 forwardly, as shown in Fig. 3. This forward movement of the piston 18 acts through the linkage 16 and 15 to rotate the cams 14, thereby to move the form members 10 toward each other and against the handle 5.

As the carriage 21 continues its forward movement, the air pressure remains on in the cylinders 19 and 28 as described because of the straight portion 44ᶜ (Fig. 6) in the pathway of the valve-actuating member 41. During this continued forward movement of the carriage 21 the wedging member 24 and forming member 23 are moved between the mold members 10. Since the wedging member 24 enters the slot in the portion 4 of the handle 5 in advance of the forming member 23, the two side portions at the sides of the slit are first wedged apart, as shown in Fig. 4. Thereafter as the carriage continues its forward movement the valve 40 is turned into the position shown in Fig. 9 by the roller entering the portion 44ᵉ of the pathway and then assuming the position B, as shown in dotted lines in Fig. 6. In that position the air pressure is cut off from the rear side of the piston 27 in the cylinder 28 (but not from the cylinder 19), so that the forming member 23 may move relative to the wedging member 24. As shown in Figs. 4 and 5, the wedging member 24 first enters the slit in the handle and wedges the sides apart and then when it reaches a point near the end of the slit it stops in its forward movement, the handle holding it while the forming member continues and spreads the sides of the handle to conform with the shape of the walls provided by the grooves 13 in the forming members 10. During the forming operation the cylinder 28 moves with the carriage 21 relative to the piston 27 and the air in the cylinder is exhausted to the atmosphere, through the port 52 which is connected to the port 46 by means of the groove 53 when the valve 40 is in the position shown in Fig. 9.

During the wedging and forming operations the stop 9 and handle-positioning finger 8 are moved out of the way by the wedging member and the thrust upon the handle 5 is taken by the stop member 6.

As the carriage reaches the end of its forward stroke the valve 40 assumes a position as shown in Fig. 7 and then the operating mechanism immediately starts the return movement of the carriage and in this return movement the members 10 of the mold means are moved apart so that the operator may remove the handle which is then ready to have a grip-piece inserted between the spaced ends. During the return movement of the valve-actuating member 41, the sloping portion 54 actuates the roller to a position C shown in dotted lines in Fig. 6 and moves the valve 40 into the position shown in Fig. 10, thereby cutting off the supply of air to the rear side of the piston 18 in the cylinder 19 permitting the pressure to be released through the port 55 connected to the port 50 by means of the groove 56 in the valve 40.

Since the front end of the cylinder 19 is connected to a port 57 in the valve casing 39 by a conduit 58, air pressure is admitted to the front side of the piston through the passage 49 which is now in communication with the passage 57. Thus, the piston 18 is moved rearwardly and the linkage 16 and 15 rotates the cams 14 to release their pressure on the form members 10. The form members are spread apart by means of the chain links 59, each of which is connected at one end to a member 10 and at the other end rigidly to the cams 14 so that they will pull the members 10 when the cams are rotated in a contra-clockwise direction, as shown in Figs. 5 and 1, respectively.

After the mold members have been spread apart to permit removal of the handle 5, the valve is returned to its normal position (Fig. 7) by the descending portion 60 in the pathway of the part 41.

The pivoted finger 44ª is moved out of the way by the roller 43, thereby to permit complete return of the roller to its normal position with relation to the part 41. After the roller passes the finger 44ª is snapped back by the spring 61 so that it will again be in position to operate the valve 40, as hereinbefore described.

The adjusting screw 62, shown at the left-hand end of the plate 3 in Figs. 1 and 2, provides an adjustable stop which is used when longer handles are to be inserted in the machine. In case of the use of longer handles the stop member 6 is removed.

Each half 10 of the mold means has a bore (Figs. 4 and 5) in which is located a presser member 63 extending through slots in the walls 12 adjacent to the lower curves of the diverging portions of the handle part 5. These presser members 63 are pressed through and beyond the walls 12 by springs 64 and their ends are shaped to contact with the metal casing parts of the handle means 4 to prevent wrinkling during the forming portion of the operation.

My machine is simple in construction and operation and is very efficient in the quality of work it does and the speed with which it operates.

While I have illustrated and described a preferred embodiment of my invention I do not wish to be limited thereby, because the scope of my invention is best defined by the following claims.

Claims:

1. Apparatus for forming handles for tools comprising mold means having diverging side walls conforming substantially to the desired shape of the exterior contour of the sides of a finished D-handle and a spreading mechanism for spreading and shaping a split portion of the tool handle against the side walls of the mold means, said mold means and said spreading mechanism being arranged to permit relative longitudinal approaching movement and said spreading mechanism including two relatively movable members each of which is adapted to perform a part of the spreading and shaping operation.

2. Apparatus for forming handles for tools comprising mold means having diverging side walls conforming substantially to the desired shape of the exterior contour of the sides of a finished D-handle, and a spreading mechanism for spreading and shaping a split portion of the tool handle against the side walls of the mold means, said mold means and said spreading mechanism being arranged to permit relative longitudinal approaching movement and a positioning member located between the diverging side walls of the mold means for entrance into the split in the handle to position the handle before the spreading and shaping operation.

3. Apparatus for forming handles for tools comprising mold means having diverging side walls conforming substantially to the desired shape of the exterior contour of the sides of a finished D-handle and a spreading mechanism for spreading and shaping a split portion of the tool handle against the side walls of the mold means, said mold means and said spreading mechanism being arranged to permit relative longitudinal approaching movement and a pivoted stop member located between the diverging side walls of the mold means for engagement with the split end of the handle to position the end of the handle with relation to the mold means.

4. Apparatus for forming handles for tools comprising mold means having diverging side walls conforming substantially to the desired shape of the exterior contour of the sides of a finished D-handle and a spreading mechanism for spreading and shaping a split portion of the tool handle against the side walls of the mold means, said mold means and said spreading mechanism being arranged to permit relative longitudinal approaching movement, a pivoted positioning member and a pivoted stop member, each located between the side walls of the mold means and cooperating with the split end of a handle thereby to position the handle relative to the mold means and the split in the handle relative to the spreading and shaping means.

5. Apparatus for forming handles for tools comprising a supporting frame structure, mold means supported upon said frame structure and having two halves movable toward and away from each other to receive a split handle member between them, each of said mold halves having a wall diverging with relation to the wall of the other and a spreading mechanism supported upon said frame structure and adapted to be entered into the mold means to spread the split end of a handle.

6. Apparatus for forming handles for tools comprising a supporting frame structure, mold means supported upon said frame structure and having two halves movable toward and away from each other to receive a split handle member between them, each of said mold halves having a wall diverging with relation to the wall of the other, a spreading mechanism supported upon said frame structure and adapted to be entered into the mold means to spread the split end of a handle and said spreading mechanism including two relatively movable members each of which is adapted to perform a part of the spreading and shaping operation.

7. Apparatus for forming handles for tools comprising a supporting frame structure, mold means supported upon said frame structure and having two halves movable toward and away from each other to receive a split handle member between them, each of said mold halves having a wall diverging with relation to the wall of the other, a spreading mechanism supported upon said frame structure and adapted to be entered into the mold means to spread the split end of a handle and pressure-actuated means connected to said mold means for opening and closing the said halves of the mold means.

8. Apparatus for forming handles for tools comprising a supporting frame structure, mold means supported upon said frame structure and having two halves movable toward and away from each other to receive a split handle member between them, each of said mold halves having a wall diverging with relation to the wall of the other, a spreading mechanism supported upon said frame structure and adapted to be entered into the mold means to spread the split end of a handle, said spreading mechanism comprising a wedging member and a forming member and means operable to move the wedging member relative to the forming member thereby to spread the split portion of the handle before the forming member presses the portions at the side of the split against the side wall of the mold means.

9. Apparatus for forming handles for tools comprising a supporting frame structure, mold means supported upon said frame structure and having two halves movable toward and away from each other to receive a split handle member between them, each of said mold halves having a wall diverging with relation to the wall of the other, a spreading mechanism supported upon said frame structure and adapted to be entered into the mold means to spread the split end of a handle, said spreading mechanism comprising a wedging member and a forming member, means operable to move the wedging member relative to the forming member thereby to spread the split portion of the handle before the forming member presses the portions at the side of the split against the side wall of the mold means and a pressure-actuated piston means connected to said wedging member for operation thereof.

10. In a machine for spreading the longitudinally divided telescoped wooden and metal side portions of a handle, a frame, a mold means supported by said frame and having diverging side walls, a spreading and forming means reciprocably mounted upon said frame for movement into and out from the mold means, said spreading and forming means comprising a wedging member and a forming member operable relative to each other and a coordinated spreading and forming means controlling mechanism operable to move the spreading member toward the mold means, then to move the spreading and forming members as a unit toward and between the side portions of the handle to wedge them apart and thereafter to move the forming member toward the mold means relative to the spreading member to press the side portions of the handle against the side walls of the mold means.

11. In a machine for spreading the longitudinally divided telescoped wooden and metal side portions of a handle, a frame, a mold means supported by said frame and having diverging side walls, a carriage mounted upon said frame for reciprocation toward and away from said mold means, a spreading means carried by said carriage and operable therewith for spreading and shaping the side portions of the handle, said spreading means comprising a wedging member and a forming member operable relative to each other, a piston means carried by said carriage and adapted to operate one of said members relative to the other, a mechanism for reciprocating said carriage and a valve and valve-actuating member associated with said carriage and operable by movement thereof thereby to control the admission of pressure to said piston means.

12. In a machine for spreading the longitudinally divided telescoped wooden and metal side portions of a handle, a frame, a mold means supported by said frame and having diverging side walls, a carriage mounted upon said frame for reciprocation toward and away from said mold means, a spreading means carried by said carriage and operable therewith for spreading and shaping the side portions of the handle, said spreading means comprising a wedging member and a forming member operable relative to each other, a piston means carried by said carriage and connected to said wedge member for operation thereof relative to the forming member, a mechanism for reciprocating said carriage and a valve and valve-actuating member associated with said carriage and operable by movement thereof thereby to control the admission of pressure to said piston means.

13. In a machine for spreading the longitudinally divided telescoped wooden and metal side portions of a handle, a frame, a mold means supported by said frame and having diverging side walls, a carriage mounted upon said frame for reciprocation toward and away from said mold means, a spreading means carried by said carriage and operable therewith for spreading and shaping the side portions of the handle, said spreading means comprising a wedging member and a forming member operable relative to each other, a piston means carried by said carriage and connected to said wedge member for operation thereof relative to the forming member, a mechanism for reciprocating said carriage and a valve and valve-actuating member associated with said carriage and operable by movement thereof thereby to control the admission of pressure to said piston means, the said valve-actuating member being attached to and movable with the carriage and the valve being fixed relative to said frame and controlling the flow of pressure through conduit means connecting a source of pressure supply with said piston means.

14. In a machine for spreading the longitudinally divided telescoped wooden and metal side portions of a handle, a frame, a mold means supported by said frame and having two halves movable toward and away from each other to receive the handle between them, each of said mold halves having a wall diverging with relation to the wall of the other, a piston means supported by said frame and operably connected to said mold halves for actuating them, a spreading mechanism reciprocably supported by said frame and adapted to be operated relative to the mold means to spread the side portions of said handle against the diverging walls of the mold means, and a valve and valve-actuating member operable by movement of said spreading mechanism to control the supply of pressure from a source of pressure supply through conduit means to said piston means.

15. In a machine for spreading the longitudinally divided telescoped wooden and metal side portions of a handle, a frame, a mold means supported by said frame and having two halves movable toward and away from each other to receive the handle between them, each of said mold halves having a wall diverging with relation to the wall of the other, a piston means supported by said frame and operably connected to said mold halves for actuating them, a spreading mechanism reciprocably supported by said frame and adapted to be operated relative to the mold means to spread the side portions of said portions of said handle against the diverging walls of the mold means and a valve and valve-actuating member operable by movement of said spreading mechanism to control the supply of pressure from a source of pressure supply through conduit means to said piston means, the said valve-actuating member connected to and movable with the spreading member and the valve being fixed relative to said frame and controlling the flow of pressure through conduit means connecting a source of pressure supply with said piston means.

16. In a machine for spreading the longitudinally divided telescoped wooden and metal side portions of a handle, a frame, a mold means supported by said frame and having two halves movable toward and away from each other to receive the handle between them, each of said mold halves having a wall diverging with relation to the wall of the other, a piston means supported by said frame and operably connected to said mold halves for actuating them, a spreading mechanism reciprocably supported by said frame and adapted to be operated relative to the mold means to spread the side portions of said handle against the diverging walls of the mold means, a piston means carried by said carriage and adapted to operate one of said members relative to the other, a mechanism for reciprocating said carriage and a valve and valve-actuating member operable by movement of said spreading mechanism to control the supply of pressure from a source of pressure supply through conduit means to said piston means.

17. Apparatus for forming handles for tools comprising a supporting frame structure, mold means supported upon said frame structure and having two halves movable toward and away from each other to receive a split handle member between them, each of said mold halves having a wall diverging with relation to the wall of the other, a spreading mechanism supported upon said frame structure and adapted to be entered into the mold means to spread the split end of a handle and cam means operable to move the mold halves toward each other.

18. Apparatus for forming handles for tools comprising a supporting frame structure, mold means supported upon said frame structure and having two halves movable toward and away from each other to receive a split handle member between them, each of said mold halves having a wall diverging with relation to the wall of the other, a spreading mechanism supported upon said frame structure and adapted to be entered into the mold means to spread the split end of a handle, cam means operable to move the mold halves toward each other and piston means connected through suitable linkage with said cam means and said mold halves for moving them relative to each other.

19. In a machine for spreading the longitudinally divided telescoped wooden and metal side portions of a handle, a frame, a mold means supported by said frame and having diverging side walls, a spreading and forming means reciprocably mounted upon said frame for movement into and out from the mold means, said spreading and forming means comprising a wedging member and a forming member operable relative to each other, a coordinated spreading and forming means controlling mechanism operable to move the spreading member toward the mold means, then to move the spreading and forming members as a unit toward and between the side portions of the handle to wedge them apart and thereafter to move the forming member toward the mold means relative to the spreading member to press the side portions of the handle against the side walls of the mold means and presser members carried by the mold means for engagement with the side portions of the handle during the forming operation to prevent wrinkling at predetermined points.

20. Apparatus for forming handles for tools comprising a supporting frame structure, mold means supported upon said frame structure and having two halves movable toward and away from each other to receive a split handle member between them, each of said mold halves having a wall diverging with relation to the wall of the other and a spreading mechanism supported upon said frame structure and adapted to be entered into the mold means to spread the split end of a handle, and each of said mold halves having a spring pressed presser member extending through the side wall as and for the purposes illustrated and described.

In testimony whereof, I have signed my name to this specification.

WILLIAM A. READY.